United States Patent
Reichert et al.

(10) Patent No.: US 9,920,139 B2
(45) Date of Patent: *Mar. 20, 2018

(54) SUSPENSIONS IN AQUEOUS MEDIA

(71) Applicants: Rohm and Haas Company, Philadelphia, PA (US); Dow Global Technologies LLC, Midland, MI (US)

(72) Inventors: Matthew D. Reichert, Minneapolis, MN (US); Alfred K. Schultz, Maple Glen, PA (US); Andrew M. Savo, Cherry Hill, NJ (US); Steven Rosenberg, Shorewood, MN (US); Ralph C. Even, Blue Bell, PA (US); Lester H. Mcintosh, III, Green Lane, PA (US); Robert Johnson, Carmel, IN (US); John David Finch, North Wales, PA (US); Decai Yu, Midland, MI (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/536,735

(22) PCT Filed: Dec. 15, 2015

(86) PCT No.: PCT/US2015/065653
§ 371 (c)(1),
(2) Date: Jun. 16, 2017

(87) PCT Pub. No.: WO2016/106005
PCT Pub. Date: Jun. 30, 2016

(65) Prior Publication Data
US 2017/0369600 A1    Dec. 28, 2017

Related U.S. Application Data

(60) Provisional application No. 62/095,378, filed on Dec. 22, 2014.

(51) Int. Cl.
| | | |
|---|---|---|
| C08F 2/20 | (2006.01) | |
| C08F 12/08 | (2006.01) | |
| C08F 212/08 | (2006.01) | |
| C08F 212/36 | (2006.01) | |
| C08J 3/07 | (2006.01) | |
| C08F 2/18 | (2006.01) | |

(52) U.S. Cl.
CPC ............... *C08F 2/20* (2013.01); *C08F 12/08* (2013.01); *C08F 212/08* (2013.01); *C08F 212/36* (2013.01); *C08J 3/07* (2013.01); *C08F 2/18* (2013.01)

(58) Field of Classification Search
None
See application file for complete search history.

(56) References Cited

U.S. PATENT DOCUMENTS

| | | |
|---|---|---|
| 3,728,318 A | 4/1973 | Hamann |
| 4,427,794 A | 1/1984 | Lange et al. |
| 4,868,238 A * | 9/1989 | Craig .................. C08F 2/20 524/457 |
| 5,597,859 A | 1/1997 | Hurlock et al. |
| 2005/0182181 A1 | 8/2005 | Struck et al. |
| 2009/0176897 A1 | 7/2009 | Finch et al. |

FOREIGN PATENT DOCUMENTS

| | | |
|---|---|---|
| JP | 1095104 A | 4/1989 |
| JP | 3134003 A | 6/1991 |
| JP | 4117402 A | 4/1992 |
| WO | 2006123993 A2 | 11/2006 |

OTHER PUBLICATIONS

Monteillet, et al., "Charge-driven co-assembly of polyelectrolytes across oil-water interfaces," Soft Matter, vol. 9, pp. 11270-11275 (2013).

Kaufman, et al., "Single-step microfluidic fabrication of soft monodisperse polyelectrolyte microcapsules by interfacial complexation", Lab Chip, vol. 14 pp. 3494-3497 (2014).

Stamkulov, et al., "Stabilisation of emulsions by using a combination of an oil soluble ionic surfactant and water soluble polyelectrolytes. I: Emulsion stabilisation and Interfacial tension measurements", Colloids and Surfaces, vol. 335, pp. 103-106 (2009).

* cited by examiner

*Primary Examiner* — Richard A Huhn
(74) *Attorney, Agent, or Firm* — Carl P. Hemenway

(57) ABSTRACT

Provided is a suspension comprising liquid droplets dispersed in an aqueous medium, wherein said droplets comprise (a) one or more water-insoluble compounds, and (b) a vinyl polyelectrolyte (PED) having a polarity, and wherein said aqueous medium comprises a polyelectrolyte (PEW) having a polarity that is opposite to the polarity of said polyelectrolyte (PED). Also provided are a method of making such a suspension and a method using such a suspension in a process of suspension polymerization.

6 Claims, No Drawings

SUSPENSIONS IN AQUEOUS MEDIA

Suspensions in aqueous media of liquid droplets of water-insoluble compounds are useful for a variety of purposes. For example, when such droplets contain vinyl monomer and initiator, the monomer may undergo polymerization to form polymer particles in a process of suspension polymerization. Such polymer particles are useful for a variety of purposes, including, for example, as resins that are adsorptive or that have ion exchange functionality or both. Such resins are used for a wide variety purposes, including, for example, purification of foods and/or beverages.

In the past, suspensions in aqueous media of liquid droplets of water-insoluble vinyl monomers have been stabilized by the addition of one or more stabilizing compound, and a common stabilizing compound is gelatin. Because gelatin is an animal product, many consumers do not wish to purchase or consume foods or beverages that were purified through contact with resins that were made using gelatin.

In the past, some dispersions of liquid droplets of water-insoluble compound used non-polymeric surfactants. The use of non-polymeric surfactants (such as hexadecyl amine) is undesirable because such surfactants are very mobile could contaminate resins made using such surfactants, and in turn any foods or beverages purified with such resins could contain undesirably high levels of the surfactants. Additionally, in the course of making the present invention it has been determined that use of non-polymeric surfactants does not result in droplet surface with the desired mechanical strength.

H. Monteillet et al. ("Charge-driven co-assembly of polyelectrolytes across oil-water interfaces," Soft Matter, 2013, vol. 9, p. 11270-11275) describe the use of poly(fluorene-co-benzothiadiazone-co-benzoic acid) and polydiallyldimethylammonium chloride in making emulsions. Monteillet et al. teach that their method is not sufficient to stabilize a highly concentrated emulsion unless the coacervate formed from poly(fluorene-co-benzothiadiazone-co-benzoic acid) and polydiallyldimethylammonium chloride is crosslinked via amide bond formation between the poly(fluorene-co-benzothiadiazone-co-benzoic acid) and the polydiallyldimethylammonium chloride. It is desired to provide a dispersion of liquid droplets of water-insoluble compound in an aqueous medium that uses vinyl polyelectrolyte in the droplets. It is also desired to provide a dispersion of liquid droplets of water-insoluble compound in an aqueous medium that has good stability. It is also desired to provide a stable dispersion of liquid droplets of water-insoluble compound in an aqueous medium that maintains stability after exposure to elevated temperature.

It is desired to provide a dispersion of liquid droplets of water-insoluble compound in an aqueous medium that does not require the presence of either gelatin or non-polymeric surfactant.

The following is a statement of the invention.

A first aspect of the present invention is a suspension comprising liquid droplets dispersed in an aqueous medium, wherein said droplets comprise (a) one or more water-insoluble compounds, and
(b) a vinyl polyelectrolyte (PED) having a polarity, and
wherein said aqueous medium comprises a polyelectrolyte (PEW) having a polarity that is opposite to the polarity of said polyelectrolyte (PED).

A second aspect of the present invention is a method of making a suspension comprising (A) providing a non-aqueous solution comprising (a) one or more water-insoluble compounds (A)(a), and
(b) a vinyl polyelectrolyte (PED) having a polarity, (B) providing an aqueous solution comprising a polyelectrolyte (PEW) dissolved in an aqueous medium, wherein the polyelectrolyte (PEW) has a polarity opposite to the polarity of the polyelectrolyte (PED), (C) forming a mixture by bringing the non-aqueous solution (A) into contact with the aqueous solution (B), and (D) agitating the mixture to produce a suspension of droplets in an aqueous medium, wherein the droplets comprise the water-insoluble compounds (A)(a).

The following is a detailed description of the invention.

As used herein, the following terms have the designated definitions, unless the context clearly indicates otherwise.

As used herein, a composition is a liquid if it is in the liquid state over a range of temperatures that includes the range 15° C. to 30° C. An aqueous medium is a liquid composition that contains water in an amount of 50% or more by weight based on the weight of the aqueous medium. Compounds that are dissolved in the aqueous medium are considered herein to be part of the aqueous medium. Droplets that are dispersed in an aqueous medium have volume-average particle diameter of 50 nm to 1 mm A suspension of liquid droplets in an aqueous medium is a composition in which liquid droplets are distributed throughout the aqueous medium. A suspension may or may not be stable; that is, agitation may or may not be required to keep the droplets distributed throughout the aqueous medium without either settling to the bottom or rising toward the top of the container.

A compound is considered herein to be water-insoluble if the amount of that compound that can be dissolved in 100 g of water at 25° C. is 1 g or less. A compound is considered herein to highly soluble in water if the amount of that compound that can be dissolved in 100 g of water at 25° C. is 5 g or more.

"Resin" as used herein is a synonym for "polymer." A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Polymers have weight-average molecular weight of 2,000 or more.

Molecules that can react with each other to form the repeat units of a polymer are known herein as "monomers." The repeat units so formed are known herein as "polymerized units" of the monomer.

Vinyl monomers have the structure

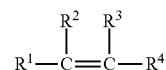

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers have molecular weight of less than 2,000. Vinyl monomers include, for example, styrene, substituted styrenes, dienes, ethylene, ethylene derivatives, and mixtures thereof. Ethylene derivatives include, for example, unsubstituted and substituted versions of the following: vinyl acetate, acrylonitrile, (meth)acrylic acids, alkyl esters of (meth)acrylic acid, amides of (meth)acrylic acid, vinyl chloride, halogenated alkenes, and mixtures thereof. As used herein, "(meth)acrylic" means acrylic or methacrylic; "(meth)acrylate" means acrylate or methacrylate; and "(meth)acrylamide" means acrylamide or methacrylamide. "Substituted" means having at least one attached chemical group such as, for example, alkyl group, alkenyl group, vinyl group, hydroxyl group, carboxylic acid group, other functional groups, and combinations thereof. As used herein, vinyl aromatic monomers are monomers in which one or more of $R^1$, $R^2$, $R^3$, and $R^4$ contains one or more aromatic ring. A monovinyl monomer is a vinyl monomer that has exactly one non-aromatic carbon-carbon double bond per molecule. A multivinyl monomer is a vinyl monomer that has two or more non-aromatic carbon-carbon double bonds per molecule.

A polymer in which 90 mole % or more of the polymerized units are polymerized units of one or more vinyl monomer is a vinyl polymer. A polymer is synthetic if it is not found in nature and is not the result of one or more chemical reactions performed on a polymer that is found in nature that do not destroy the polymer backbone chain.

As used herein, an ethyleneimine-type polymer is a polymer containing polymerized units of ethyleneimine, substituted ethyleneimine, or a mixture thereof.

An ionic group is a chemical group that bears either a positive or negative charge when dissolved in or in contact with an aqueous medium over a range of pH values (the "ionic range" of that group). The ionic range has the size of at least 1.5 pH units, and the ionic range either falls within the range of from pH=5 to pH=11 or else the ionic range has an overlap of the range from pH=5 to pH=11, and the size of the overlap is 1.5 pH units or larger. A chemical group that bears a negative charge in its ionic range is known herein as an anionic group. A chemical group that bears a positive charge in its ionic range is known herein as an cationic group. An ionic group is considered to bear a charge at a certain pH value if, in contact with or dissolved in an aqueous medium at that pH value, 50 mole % or more of the ionic groups that are in contact with or dissolved in the aqueous medium are in the ionic state.

A monomer that has a polymerizable group and an anionic group that remains intact through the polymerization reaction is an anionic monomer. A monomer that has a polymerizable group and a cationic group that remains intact through the polymerization reaction is a cationic monomer. A monomer that has neither an anionic group nor a cationic group is a nonionic monomer.

An initiator is a compound that is capable of producing at least one free radical under conditions in which that free radical can interact with monomer. Conditions that cause some initiators to produce at least one free radical include, for example, elevated temperature, exposure to photons, exposure to ionizing radiation, reactions of certain compounds (such as, for example, oxidation-reduction pairs of compounds), and combinations thereof.

A porogen is a compound that has the following characteristics: it is not a monomer; it has boiling point at 1 atmosphere pressure of 200° C. or lower; it has solubility in 100 g of water at 25° C. of 0 to 10 grams.

A polyelectrolyte is a polymer that contains 3 mole % or more of polymerized units of one or more monomers that contain ionic groups. A mono-polar polyelectrolyte is a polyelectrolyte in which either the ionic groups are either all anionic groups or all cationic groups. A mono-polar polyelectrolyte in which all the ionic groups are anionic groups is known herein as an anionic polyelectrolyte and is said herein to have a negative polarity. A mono-polar polyelectrolyte in which all the ionic groups are cationic groups is known herein as a cationic polyelectrolyte and is said herein to have a positive polarity. A cationic polyelectrolyte and an anionic polyelectrolyte are said herein to have polarity opposite of each other. A zwitterionic polyelectrolyte contains some cationic groups and some anionic groups. A polyelectrolyte that is a vinyl polymer is a vinyl polyelectrolyte.

A non-polymeric surfactant is a compound whose molecule contains one or more fatty group and one more ionic group. A fatty group is a chemical group having 8 or more carbon atoms bonded in a linear fashion to each other. A non-polymeric surfactant has molecular weight less than 2,000.

The present invention involves a suspension of liquid droplets (D) dispersed in an aqueous medium. Preferably, the amount of water in the aqueous medium, by weight based on the weight of the aqueous medium, 60% or more; more preferably 70% or more; more preferably 80% or more.

The liquid droplets (D) contain one or more water-insoluble compounds. Preferably the water insoluble compound(s) contain one or more water-insoluble vinyl monomers; more preferably styrene, divinylbenzene, (meth) acrylonitrile, one or more water-insoluble substituted styrenes, one or more water-insoluble alkyl ester of (meth) acrylic acid, or a mixture thereof; more preferably styrene, divinylbenzene, or a mixture thereof.

The liquid droplets (D) preferably also contain one or more initiator. Preferably the initiator(s) contain one or more water-insoluble initiator. Preferred water-insoluble initiator are water-insoluble peroxide initiators and water-insoluble azo initiators. Among water-insoluble peroxide initiators, preferred are peroxyesters, peroxydicarbonates, dialkyl peroxides, diacyl peroxides, hydroperoxides, peroxyketals, ketone peroxides, and mixtures thereof; more preferred are peroxyesters, diacyl peroxides, and mixtures thereof; more preferred are t-butyl peroctoate and benzoyl peroxide.

In some embodiments, the liquid droplets (D) contain one or more porogen. Preferred porogens are soluble in the remaining ingredients of the liquid droplets (D). Preferably, the amount of porogen that could be dissolved at 25° C. in 100 grams of a solvent consisting of the remaining ingredients of the liquid droplets (D) is 10 grams or more; more preferably 20 grams or more; more preferably 50 grams or more. One suitable porogen is methylisobutyl carbinol.

It is useful to characterize the contents of the liquid droplets (D) by defining a category "D-X," which is the category of all compounds other than vinyl monomer, initiator, porogen, and polyelectrolyte (PED). Preferably, the amount of D-X in the liquid droplets (D) is, by weight based on the weight of liquid droplets (D), 0 to 20%; more preferably 0 to 10%; more preferably 0 to 5%; more preferably 0 to 2%; more preferably 0 to 1%.

It is useful to characterize the contents of the aqueous medium by defining a category AQ-X, which is the category of all compounds other than water and polyelectrolyte (PEW). Preferably, the amount of AQ-X in the aqueous medium, by weight based on the weight of the aqueous medium, is 0 to 20%; more preferably 0 to 10%; more preferably 0 to 5%; more preferably 0 to 2%; more preferably 0 to 1%.

Preferably the liquid droplets (D) have volume-average particle diameter of 1 µm or larger; more preferably 3 µm or larger; more preferably 10 µm or larger; more preferably 30 µm or larger. Preferably the liquid droplets (D) have volume-average particle diameter of 500 µm or smaller.

The present invention involves two polyelectrolytes, herein designated polyelectrolyte (PED) and polyelectrolyte (PEW). The liquid droplets (D) contain polyelectrolyte (PED), and the aqueous phase contains polyelectrolyte (PEW). Polyelectrolyte (PEW) and polyelectrolyte (PED) are both monopolar polyelectrolytes, and they have polarity opposite of each other. That is, either polyelectrolyte (PED) is an anionic polyelectrolyte and polyelectrolyte (PEW) is a cationic polyelectrolyte or else polyelectrolyte (PED) is a cationic polyelectrolyte and polyelectrolyte (PEW) is an anionic polyelectrolyte. Preferably, polyelectrolyte (PED) is an anionic polyelectrolyte and polyelectrolyte (PEW) is a cationic polyelectrolyte.

Preferably, polyelectrolyte (PED) is dissolved in liquid droplets (D). Preferably polyelectrolyte (PEW) is dissolved in the aqueous medium.

It is contemplated that some amount of polyelectrolyte (PED) may be present in the aqueous medium. It is contemplated that some amount of polyelectrolyte (PEW) may be present in the droplets (D).

Either polyelectrolyte (PED) or polyelectrolyte (PEW) may be an anionic polyelectrolyte. Preferred anionic polyelectrolytes are vinyl polymers. Preferably the anionic polyelectrolyte contains polymerized units of one or more anionic vinyl monomers. Preferred anionic vinyl monomers have carboxylic acid groups or anhydride groups or sulfonic acid groups. Preferred anionic vinyl monomers are (meth)acrylic acid, maleic anhydride, and styrene sulfonic acid. Preferably, the amount of polymerized units of anionic vinyl monomer in the anionic polyelectrolyte is, by mole %, is 3.5% or more; more preferably 4% or more.

Either polyelectrolyte (PED) or polyelectrolyte (PEW) may be a cationic polyelectrolyte. Preferred cationic polyelectrolytes are synthetic polymers more preferred are synthetic vinyl polymers or synthetic polyeneimine-type polymers; more preferred are synthetic vinyl polymers. Preferably the cationic polyelectrolyte contains polymerized units of one or more cationic vinyl monomer. Preferred cationic vinyl monomers contain an amine group, which may be primary, secondary, tertiary, or quaternary; preferably quaternary. Preferred quaternary ammonium vinyl monomers are (meth)acrylamidoalkyltrialkylammonim quaternary compounds, diallyldialkylammonium quaternary monomers, and mixtures thereof; more preferred are diallyldialkylammonium quaternary monomers; more preferred is diallyldimethylammonium halide. Under many common polymerization conditions, a diallyldialkyammonium quaternary monomer forms a polymerized unit that is a 5-membered ring. Preferably, the amount of polymerized units of cationic vinyl monomer is 4 mole % or more.

Preferably, polyelectrolyte (PED) contains polymerized units of one or more nonionic monomer in addition to polymerized units of one or more ionic monomer. Preferably, polyelectrolyte (PED) contains polymerized units of one or more nonionic monomer that is water-insoluble. More preferably, polyelectrolyte (PED) contains polymerized units of one or more nonionic monomer that has solubility in 100 g of water at 25° C. of 0.1 gram or less; more preferably 0.05 g or less. Among monomers that are water-insoluble, preferred are alkyl esters of (meth)acrylic acid, styrene, and derivatives of styrene. Among water-insoluble alkyl esters of (meth)acrylic acid, preferred are those in which the alkyl group has 6 or more carbon atoms; more preferably 8 or more carbon atoms. Among water-insoluble alkyl esters of (meth)acrylic acid, preferred are those in which the alkyl group has 22 or fewer carbon atoms; more preferably 20 or fewer. Among water-insoluble derivatives of styrene, preferred are alpha-alkyl styrenes and ortho-, meta-, or para-alkyl styrenes.

Preferably the amount of polymerized units of nonionic monomer in polyelectrolyte (PED) is 50 mole % or more; more preferably 60 mole % or more; more preferably 70 mole % or more; more preferably 80 mole % or more.

Preferably the amount of polymerized units of ionic monomer in polyelectrolyte (PED) is 3.5 mole % or more; more preferably 4.5 mole % or more. Preferably the amount of polymerized units of ionic monomer in polyelectrolyte (PED) is 20 mole % or less; more preferably 10 mole % or less; more preferably 12 mole % or less.

It is useful to describe the polymerized units of polyelectrolyte (PED) by defining a category "PED-X," which is the category of monomers that are neither nonionic water insoluble monomers nor ionic monomers. Preferably, the amount of polymerized units of PED-X monomers in polyelectrolyte (PED) is 0 to 10 mole %; more preferably 0 to 3 mole %, more preferably 0 to 1 mole %; more preferably 0.

Preferably, polyelectrolyte (PED) is either a homopolymer or is a random copolymer.

Preferably, polyelectrolyte (PED) has weight-average molecular weight of 3,000 or higher, more preferably 5,000 or higher. Preferably, polyelectrolyte (PED) has weight-average molecular weight of 300,000 or lower; more preferably 100,000 or lower; more preferably 75,000 or lower, more preferably 50,000 or lower; more preferably 25,000 or lower.

Preferably, polyelectrolyte (PEW) contains polymerized units of one or more nonionic monomer in addition to polymerized units of one or more ionic monomer. Preferably, polyelectrolyte (PEW) contains polymerized units of one or more nonionic monomer that is highly soluble in water. More preferably, polyelectrolyte (PEW) contains polymerized units of one or more nonionic monomer that has solubility in 100 g of water at 25° C. of 10 grams or more; more preferably 50 grams or more. Among nonionic monomers that are highly soluble in water, preferred are (meth)acrylamide, N-methylol (meth)acrylamide, hydroxyalkyl esters of (meth)acrylic acid, and mixtures thereof; more preferred are (meth)acrylamide; more preferred is acrylamide. The category of hydroxyalkyl esters of (meth) acrylic acid include monomeric compounds that are poly (ethylene oxide) esters of (meth)acrylic acid.

One suitable polyelectrolyte (PEW) is poly(ethyleneimine)

Preferably, polyelectrolyte (PEW) is either a homopolymer or a random copolymer.

Preferably, polyelectrolyte (PEW) has weight-average molecular weight of 3,000 or higher, more preferably 5,000 or higher; more preferably 10,000 or higher; more preferably 20,000 or higher; more preferably 40,000 or higher. Preferably, polyelectrolyte (PED) has weight-average molecular weight of 300,000 or lower; more preferably 100,000 or lower.

Preferably the amount of polymerized units of nonionic monomer in polyelectrolyte (PEW) is 10 mole % or more; more preferably 20 mole % or more; more preferably 30 mole % or more. Preferably the amount of polymerized units of nonionic monomer in polyelectrolyte (PEW) is 90 mole % or less; more preferably 80 mole % or less; more preferably 70 mole % or less.

Preferably the amount of polymerized units of ionic monomer in polyelectrolyte (PEW) is 10 mole % or more; more preferably 20 mole % or more; more preferably 30 mole % or more. Preferably the amount of polymerized units of ionic monomer in polyelectrolyte (PEW) is 90 mole % or less; more preferably 80 mole % or less; more preferably 70 mole % or less.

It is useful to describe the polymerized units of polyelectrolyte (PEW) by defining a category "PEW-X," which is the category of monomers that are neither nonionic monomers that are highly soluble in water nor ionic monomers. Preferably, the amount of polymerized units of PEW-X monomers in polyelectrolyte (PEW) is 0 to 10 mole %; more preferably 0 to 3 mole %, more preferably 0 to 1 mole %; more preferably 0.

Preferably polyelectrolyte (PEW) is capable of reducing the interfacial tension of the interface between the aqueous medium and the liquid droplets (D) in the absence of any other polyelectrolyte or surfactant. Preferably polyelectrolyte (PED) is capable of reducing the interfacial tension of the interface between the aqueous medium and the liquid droplets (D) in the absence of any other polyelectrolyte or surfactant. Reduction of the interfacial tension of the interface between the aqueous medium and the liquid droplets (D) can be observed by performing a shake test as described below with only one polyelectrolyte present (for example, see Example 4-2). If any evidence of turbidity or opacity is observed, it is considered that some droplets were formed, even if they are not large or stable, and any such drop formation is evidence of a reduction in the interfacial tension.

The aqueous medium has a pH value from 5 to 11. Preferably the pH value of the aqueous medium is within the ionic range of the polyelectrolyte (PEW). Preferably the pH value of the aqueous medium is within the ionic range of the polyelectrolyte (PED). Preferably the pH value of the aqueous medium is 6 or higher; more preferably 7 or higher. Preferably the pH value of the aqueous medium is 10 or lower; more preferably 9 or lower.

Preferably, the total amount of polyelectrolyte (PED) in the composition, by weight based on the total weight of the droplets (D), is 0.02% or more; more preferably 0.05% or more; more preferably 0.08% or more. Preferably, the total amount of polyelectrolyte (PED) in the composition, by weight based on the total weight of the droplets (D), is 12% or less; more preferably 10% or less; more preferably 8% or less; more preferably 6% or less.

Preferably, the total amount of polyelectrolyte (PEW) in the composition, by weight based on the total weight of the aqueous medium, is 0.02% or more; more preferably 0.05% or more; more preferably 0.08% or more. Preferably, the total amount of polyelectrolyte (PEW) in the composition, by weight based on the total weight of the aqueous medium, is 12% or less; more preferably 10% or less; more preferably 8% or less.

Preferably, the amount of non-polymeric surfactant in the composition of the present invention, by weight based on the weight of the composition, is 0 to 1%; more preferably 0 to 0.3%; more preferably 0 to 0.1%.

Preferably, the amount of water-soluble polymer that is not a polyelectrolyte is, by weight based on the total weight of the suspension, 0 to 0.1%; more preferably 0 to 0.05%; more preferably 0 to 0.02%, more preferably 0 to 0.01%, more preferably 0 to 0.005%.

The concentration of the liquid droplets (D) may be characterized by the total weight of all liquid droplets (D) as a percentage of the total weight of the suspension. Preferably, the concentration of liquid droplets (D) is 5% or more; more preferably 10% or more; more preferably 20% or more; more preferably 30% or more. Preferably, the concentration of liquid droplets (D) is 90% or less; more preferably 80% or less; more preferably 70% or less.

Preferably, no covalent bonds are formed between polyelectrolyte (PED) and polyelectrolyte (PEW).

Regarding the composition of the liquid droplets (D), among the contemplated embodiments are two embodiments herein labeled liquid droplets (DA) and liquid droplets (DB). In liquid droplets (DA), 98% or more of the non-polymeric contents of the droplets, by weight based on the total weight of non-polymeric compounds in the droplets, are water-insoluble compounds. In liquid droplets (DB), more than 2% of the non-polymeric contents of the droplets, by weight based on the total weight of non-polymeric compounds in the droplets, are compounds that are not water-insoluble. It is contemplated that some polyelectrolytes (PED) have polymerized units of polar monomers, and that such polyelectrolytes (PED) will not be soluble in all liquid droplets (DA) but will be soluble in some liquid droplets (DB).

Without limiting the present invention to any theory, it is contemplated that some or all of both polyelectrolyte (PED) and polyelectrolyte (PEW) become located at the interface between the liquid droplets (D) and the aqueous medium. It is further contemplated that the interaction between polyelectrolyte (PED) and polyelectrolyte (PEW) gives mechanical strength to that interface and stabilizes the droplet to inhibit coalescing with other droplets.

The suspension of the present invention is preferably made as follows. A non-aqueous solution (NAS) is made in which water-insoluble compound and polyelectrolyte (PED) are brought together and mixed. Preferably, all the water-insoluble compounds that are expected to become located in the droplets are mixed into this non-aqueous solution (NAS). An aqueous solution (AS) is made by dissolving into water the polyelectrolyte (PEW) and any other compounds that are expected to become located in the aqueous medium. The non-aqueous solution (NAS) and the aqueous solution (AS) are separate compositions. Preferably, no polyelectrolyte (PED) is present in the aqueous solution (AS). Preferably, no polyelectrolyte (PEW) is located in the non-aqueous solution (NAS). If any additional polyelectrolyte other that polyelectrolyte (PED) is located in the non-aqueous solution (NAS), that additional polyelectrolyte preferably has the same polarity as polyelectrolyte (PED). If any additional polyelectrolyte other that polyelectrolyte (PEW) is located in the aqueous solution (AS), that additional polyelectrolyte preferably has the same polarity as polyelectrolyte (PEW).

Preferably, the non-aqueous solution (NAS) and the aqueous solution (AS) are brought into contact and agitated sufficiently to break the non-aqueous solution into droplets and distribute them throughout the aqueous solution.

The suspension of the present invention may be used for any purpose. For example, the liquid droplets (D) may contain compounds useful for cleaning or personal care, such as, for example, soap, detergent, conditioner, dye, or a mixture thereof. The suspension may be all or part of a composition useful as a personal cleaning composition, a lotion, or a cleaning composition for laundry or for surfaces.

Preferably, the suspension is used in a process of suspension polymerization. Preferably, the liquid droplets (D) contain one or more vinyl monomers, one or more initiators, and, optionally, one or more porogen, in addition to polyelectrolyte (PED). Preferably, while mechanical agitation is maintained, the suspension is heated to a temperature at which the initiator produces sufficient free radial species to initiate a vinyl polymerization process and the suspension is kept at that temperature or higher for a time sufficient to polymerize 90% or more of the monomer (by weight based on the monomer present prior to polymerization). Preferably, the temperature is brought to 80° C. or higher. Preferably, the temperature is maintained at 80° C. or higher for 1 hour or more. Preferably, the monomer in the liquid droplets (D) remain in the droplets during the polymerization process, so that the droplets become polymer beads.

Preferably, the suspension polymerization is conducted while the suspension has pH value chosen within the ionic ranges of both the polyelectrolyte (PED) and the polyelectrolyte (PEW).

A preferred use for polymer beads produced by suspension polymerization is as resins that are either adsorbent or have ion exchange capability or both.

Preferred resins having ion exchange capability (known herein as ion exchange resins) have functional groups covalently bound to the polymer, and the functional groups are preferably sulfonic acid groups, carboxylic acid groups, quaternary amine groups, or tertiary amine groups. Preferred ion exchange resins are made by polymerization of vinyl monomers that include styrene. Preferably, after polymerization, the resin undergoes a chemical reaction to attach the functional groups.

The following are examples of the present invention. Example numbers ending in "C" denote comparative examples.

The following materials and abbreviations were used:
pbw=parts by weight
DIW=deionized water
2-EHA=2-ethylhexyl acrylate
AA=acrylic acid
DVB=divinyl benzene, supplied in a mixture containing 63% by weight DVB; the remainder is ethyl vinyl benzene
BPO=benzoyl peroxide (100% by weight purity)
t-BP=tert-butyl peroxide (stock solution is 75% by weight purity)
Tris=tris(hydroxymethyl)aminomethane
HCl=hydrochloric acid
MIBC=methylisobutyl carbinol
AM=acrylamide
Sty=styrene
p(Sty)=homopolymer poly(styrene)
PSS=poly(styrene-co-styrene sulfonic acid), 9 mol % styrene sulfonic acid, from Polymer Source, Inc.
DADMAC=diallyldimethylammonium chloride
p(DAD)=homopolymer poly(DADMAC)
AM=acrylamide
PE1=poly(2-EHA-co-AA), 5 mole % AA, number-average molecular weight approximately 8,000
PE2=poly(AM-co-DADMAC), 45 mole % AM, from Sigma-Aldrich, supplied as a solution of concentration 10% by weight in water.
PEEI=polyethyleneimine, branched Mw of approximately 25,000, from Sigma-Aldrich
PTBEAM=poly(t-butyl acrylate-co-ethyl acrylate-co-methacrylic acid), 23% methacrylic acid by weight, from Sigma-Aldrich
PSM=poly(styrene-co-maleic anhydride), Mw approximately 65,000, from Sigma-Aldrich Interfacial Compression Test:

Non-aqueous solution was placed into a 5 ml gas-tight glass syringe. Using the syringe, the non-aqueous solution was forced into a tube that extended down into a vessel containing aqueous solution; the tube curved upward, ending in a horizontal opening beneath the surface of the aqueous solution. By pressing the syringe plunger, sufficient non-aqueous solution was forced into the tube to cause a drop to form at the opening, with the drop attached to the end of the tube and extending upward into the aqueous solution. After a pause of 10 to 1000 seconds, the syringe was then slowly retracted, causing the drop to shrink. The appearance of the drop was visually observed and photographed. During shrinkage, any inhomogeneity that was observed is considered to be evidence of a structured film on the surface of the drop. Typically, inhomogeneity appears as wrinkles on the surface of the drop.

Shake Test

A 20 mL vial was loaded with a 3:2 ratio by mass of the aqueous solution to the non-aqueous solution. The vial was shaken by hand to disperse the non-aqueous solution into the aqueous solution. A mixture is said herein to "pass" the shake test if the following conditions were met: the droplets formed were stable over long periods of time, at least 2 hours; the droplets were large enough to be observed clearly under a microscope (typically in the range of 50 to 1000 µm). Among mixtures that pass the shake test, due to the relatively large size of the dispersed droplets, the droplets are extremely buoyant, and as such float rapidly to the top of the shake test container; however, the dispersed droplets remain stable within a continuous aqueous phase due to the mechanical strength of the monomer-aqueous interface. That is, among mixtures that pass the shake test, after shaking the mixture will have the appearance of a top white phase that contains droplets of the non-aqueous solution dispersed in water and a relatively clear bottom phase that contains water and dissolved ingredients. If a separate layer also appears above the desired top white layer, the mixture is said to fail the shake test. Also, if the top white layer is merely turbid and not opaque, it is considered that large, stable droplets are not formed and the sample is said to fail the shake test. It is considered that a mixture that passes the shake test will produce a suspension suitable for suspension polymerization if the droplets contain monomer.

Some of the mixtures were tested for heat stability by placing the mixture, after shaking, in an oven for 5 hours at 50° C. Samples that continued to meet the "pass" criteria for the shake test above were said to "pass" the heat stability test.

Preparation 1: Tris buffer at pH=7.5 was prepared as follows: Tris buffer was prepared by mixing 900 grams of deionized water with 1.211 grams of Tris and 0.379 grams of $NaNO_2$. Then 1 N Hydrochloric acid was used to titrate the Tris solution to a pH of 7.5 using a pH meter to monitor pH.

Preparation 2: Aqueous Solution 49.5 g of Tris buffer at pH=7.5 made in Preparation 1 was mixed with 5.5 g of the solution PE2 (10% concentration).

Preparation 3: Non-aqueous Solution

The following were mixed together: 5.55 g of DVB (65% concentration), 0.15 g BPO (75% concentration), 0.38 PE1; and 31.52 g Sty.

Preparation 4: Tris buffer at pH=8.5 was prepared as follows: Tris buffer was prepared by mixing 900 grams of deionized water with 1.211 grams of Tris and 0.379 grams of NaNO2. Then 1 N Hydrochloric acid was used to titrate the Tris solution to a pH of 8.5 using a pH meter to monitor pH.

EXAMPLE 1

Preparation of Suspension

The aqueous solution of Preparation 2 was placed into a 90 mL reactor. Then the non-aqueous solution of Preparation 3 was placed into the same reactor. The mixture was stirred at 500 rpm with a pitched-blade impeller for 30 minutes. A suspension was produced that contained droplets containing styrene, DVB, and BPO, distributed through an aqueous medium.

EXAMPLE 2

Preparation of Polymer

The mixture suspension from Example 1 was heated to 80° C. at 1° C. per minute and then held at 80° C. for 5 hours. The mixture was then heated to 92° C. over 45 minutes and then held at 92° C. for 60 minutes. Polymer beads were produced by suspension polymerization of the droplets.

EXAMPLE 3

Interfacial Compression Testing

Three samples were tested in the interfacial compression test. The results were as follows:

| Example | Aqueous Solution | Non-Aqueous Solution | Wrinkles observed? |
|---|---|---|---|
| 3-1C | 0.5 pbw p(DAD)<br>99.5 pbw DIW | 54 pbw styrene<br>06 pbw DVB<br>40 pbw MIBC<br>0.005 pbw stearic acid | no |
| 3-2 | 0.05 pbw p(DAD)<br>99.95 pbw DIW | 54 pbw styrene<br>06 pbw DVB<br>40 pbw MIBC<br>0.05 pbw PSS | yes |
| 3-3C | 0.4 pbw P(DAD)<br>0.2 pbw gelatin<br>0.2 pbw boric acid<br>0.27 pbw NaOH<br>0.037 pbw NaNO$_2$<br>98.983 pbw DIW | 54 pbw styrene<br>06 pbw DVB<br>40 pbw MIBC | yes |

Comparative Example 3-1C shows that use of stearic acid, a monomeric surfactant, does not lead to wrinkling; the lack of wrinkling indicates that use of stearic acid does not lead to a mechanically strong surface of the drop. Example 3-2 and Comparative Example 3-3C both show wrinkling, which indicates a mechanically strong surface of the drop. Comparative Example 3-3C uses gelatin, which is undesirable, and Comparative Example 3-3C did not add polyelectrolyte to the non-aqueous solution.

EXAMPLE 4

Shake Testing

Results of shake tests were as follows. Each aqueous solution was PE2 (poly(AM-co-DADMAC)) in the amount shown, dissolved in tris buffer solution of pH=7.5, as describe in Preparation 1 above. Each non-aqueous solution was PE3 (poly(2-EHA-co-AA)) in the amount shown, dissolved in solvent, where the solvent was a mixture of 90% styrene and 10% DVB, by weight based on the weight of the solvent.

| Example | PE2 in Aqueous Solution[1] | PE1 in Non-Aqueous Solution[2] | Shake Test |
|---|---|---|---|
| 4-1 | 0 | 0 | fail |
| 4-2 | 0 | 0.5% | fail |
| 4-3 | 0 | 1% | fail |
| 4-4 | 0.1% | 0 | Fail |
| 4-5 | 0.1% | 0.5% | Pass |
| 4-6 | 0.1% | 1% | Pass |
| 4-7 | 0.3% | 0 | Fail |
| 4-8 | 0.3% | 0.5% | Pass |
| 4-9 | 0.3% | 1% | Pass |

[1] amount of PE2, by weight based on the weight of the aqueous solution
[2] amount of PE1, by weight based on the weight of the non-aqueous solution Example 4-1 formed two clear layers that did not mix or form droplets at all. Examples 4-2 and 4-3 formed a turbid layer at the top of the vial instead of the desired opaque white layer, and so they are said to fail. The fact that Examples 4-2 and 4-3 formed some turbidity shows that the PE1 reduced the interfacial tension somewhat between the non-aqueous solution and the aqueous solution.

Results of additional shake tests were as follows:

| Example | PE2 in Aqueous Solution[1] | PE1 in Non-Aqueous Solution[2] | Shake Test |
|---|---|---|---|
| 4-10 | 0.5% | 0 | Fail |
| 4-11 | 0.5% | 0.5% | Pass |
| 4-12 | 0.5% | 1% | Pass |
| 4-13 | 1.0% | 0 | Fail |
| 4-14 | 1.0% | 0.5% | Pass |
| 4-15 | 1.0% | 1% | Pass |

[1] amount of PE2, by weight based on the weight of the aqueous solution
[2] amount of PE1, by weight based on the weight of the non-aqueous solution The above table demonstrates that when PE1 and PE2 are both used, the mixture passes the shake test, which indicates that a suspension is formed that would be suitable for use in suspension polymerization.

EXAMPLE 5

Additional Suspension Polymerization

Each reactor vessel was loaded with 30 grams of aqueous solution and 20 grams of non-aqueous solution and stirred with a pitch-blade impeller at 700 rpm. The mixture was heated at 1° C. per minute to 80° C. and held at 80° C. for 5 hours. The mixture was then heated gradually over 45 minutes to 92° C. and held at 92° C. for 60 minutes. The products were cooled to 25° C. and analyzed.

Each aqueous solution was PE2 (poly(AM-co-DADMAC)) at 1 wt% based on the weight of the aqueous solution, dissolved in tris buffer at either pH=7.5 or tris buffer at pH=8.5. Each non-aqueous solution was initiator and PE1 (poly(2-EHA-co-AA)) dissolved in a solvent of 90% styrene and 10% DVB by weight based on the weight of the solvent. The initiator was either t-BP (at 0.4 wt % of the t-BP stock solution, based on the weight of the non-aqueous solution) or BPO (at 0.3 wt % based on the weight of the non-aqueous solution). The amount of PE2 was 1 wt % based on the weight of the non-aqueous solution. The size of the resulting polymer beads was measured by light scattering using a Beckman-Coulter particle size analyzer and reported as the median diameter on a volume basis. Results were as follows:

| Example | initiator | pH | Bead diameter (μm) |
|---|---|---|---|
| 5-1 | t-BP | 7.5 | none[3] |
| 5-2 | t-BP | 8.5 | 352 |
| 5-3 | BPO | 7.5 | 429 |
| 5-4 | BPO | 8.5 | 460 |

EXAMPLES 6 and 7

Shake Tests Involving MIBC

First, the following mixtures were made, using 0.2 grams polyelectrolyte (PED) and 18.8 grams of solvent in a vial. Each solvent had the amount of MIBC shown, and the remainder of the solvent was styrene and DVB in a weight ratio of styrene to DVB of 9:1. In some cases, some sedimentation was observed at the bottom of the vial, showing that the polyelectrolyte (PED) did not dissolve completely. In all cases, a clear solution formed at the top portion of the vial.

A sample of 6 grams of solution was removed from the top of each vial and mixed with 9 grams of aqueous solution in a shake test performed as above. The aqueous solution was tris buffer at pH=7.5, mixed with 1% by weight (based on the weight of the aqueous solution) of PEEI.

| Example | MIBC[4] | (PED) | Shake Test Result |
|---|---|---|---|
| 6-1 | 0 | PTBEAM | fail |
| 6-2 | 1 | PTBEAM | fail |
| 6-3 | 1.7 | PTBEAM | fail |
| 6-4 | 2.8 | PTBEAM | fail |
| 6-5 | 4.6 | PTBEAM | fail |
| 6-6 | 7.77 | PTBEAM | pass |
| 6-7 | 12.9 | PTBEAM | pass |
| 6-8 | 21.5 | PTBEAM | pass |
| 6-9 | 35.9 | PTBEAM | fail |
| 6-10 | 59.9 | PTBEAM | fail |

[4]weight % based on the weight of the solvent

When the specific polyelectrolyte (PED) is PTBEAM, then the correct amount of MIBC to make PTBEAM soluble in the droplets is 7 to 30% by weight.

| Example | MIBC[4] | (PED) | Shake Test Result |
|---|---|---|---|
| 7-1 | 0 | PSM | fail |
| 7-2 | 1 | PSM | fail |
| 7-3 | 1.7 | PSM | fail |
| 7-4 | 2.8 | PSM | fail |
| 7-5 | 4.6 | PSM | fail |
| 7-6 | 7.77 | PSM | pass |
| 7-7 | 12.9 | PSM | pass |
| 7-8 | 21.5 | PSM | pass |
| 7-9 | 35.9 | PSM | pass |
| 7-10 | 59.9 | PSM | pass |

[4]weight % based on the weight of the solvent

When the specific polyelectrolyte (PED) is PSM, then the correct amount of MIBC to make PTBEAM soluble in the droplets is 7or more by weight.

EXAMPLE 8

Heat-Aged Samples from Shake Test

Samples were subjected to the shake test as described above and then were heated at 50° C. for 5 hours. After heating, the samples were judged as "pass" or "fail" according to the same criteria as in the shake test. The results were as follows:

| Example | PE2[1] | PE1[2] | Result |
|---|---|---|---|
| 8-1 | 1 | 0.5 | fail |
| 8-2 | 0.3 | 0.5 | fail |
| 8-3 | 0.1 | 1 | pass |
| 8-4 | 0.3 | 1 | pass |
| 8-5 | 0.5 | 0.5 | pass |
| 8-6 | 0.5 | 1 | pass |
| 8-7 | 1 | 1 | pass |

[1]amount of PE2, by weight based on the weight of the aqueous solution
[2]amount of PE1, by weight based on the weight of the non-aqueous solution Many of the inventive examples also have the additional desirable property of heat stability.

The invention claimed is:

1. A suspension comprising liquid droplets dispersed in an aqueous medium, wherein said droplets comprise
   (a) one or more water-insoluble compounds, and
   (b) a vinyl polyelectrolyte (PED) having a polarity, and
   wherein said aqueous medium comprises a polyelectrolyte (PEW) having a polarity that is opposite to the polarity of said polyelectrolyte (PED).

2. The suspension of claim 1, wherein the suspension has a pH of 5 to 10.

3. The suspension of claim 1, wherein said polyelectrolyte (PED) has negative polarity and said polyelectrolyte (PEW) has positive polarity.

4. The suspension of claim 1, wherein said polyelectrolyte (PED) comprises polymerized units of ionic monomer in an amount of 3 mole % to 12 mole %.

5. The suspension of claim 1, wherein said polyelectrolyte (PEW) comprises polymerized units of ionic monomer in an amount of 40 mole % to 100 mole %.

6. A method of making a suspension comprising
   (A) providing a non-aqueous solution comprising
      (a) one or more water-insoluble compounds (A)(a), and
      (b) a vinyl polyelectrolyte (PED) having a polarity,
   (B) providing an aqueous solution comprising a polyelectrolyte (PEW) dissolved in an aqueous medium, wherein the polyelectrolyte (PEW) has a polarity opposite to the polarity of the polyelectrolyte (PED),
   (C) forming a mixture by bringing the non-aqueous solution (A) into contact with the aqueous solution (B), and
   (D) agitating the mixture to produce a suspension of droplets in an aqueous medium, wherein the droplets comprise the water-insoluble compounds (A)(a).

* * * * *